United States Patent

[11] 3,581,417

| [72] | Inventors | Paul A. Andrews<br>Belmont;<br>Paul A. Plasse, Lexington, both of, Mass. |
|---|---|---|
| [21] | Appl. No. | 717,709 |
| [22] | Filed | Apr. 1, 1968 |
| [45] | Patented | June 1, 1971 |
| [73] | Assignee | Polaroid Corporation<br>Cambridge, Mass. |

[54] AN IDENTIFICATION CARD HAVING A TRANSPARENT LAYER BONDED TO AN INFORMATION BEARING SURFACE THROUGH A NITROCELLULOSE TIE-COAT
11 Claims, 3 Drawing Figs.

[52] U.S. Cl. .................................................. 40/2.2,
156/310, 161/1, 283/7, 156/332, 161/6, 161/231,
161/232
[51] Int. Cl. ..................................................... B32b 27/06,
C09f 3/02, B23b 27/36
[50] Field of Search ........................................... 161/1, 6,
231, 232, 249; 40/2.2; 156/310, 332; 283/7

[56] References Cited
UNITED STATES PATENTS

| Re25,005 | 7/1861 | Hannon et al. | 40/2.2 |
| 2,104,057 | 1/1938 | Scott | 161/73 |
| 2,892,747 | 6/1959 | Dye et al. | 161/214 |

*Primary Examiner*—John T. Goolkasian
*Assistant Examiner*—Lorraine T. Kendell
*Attorneys*—Brown and Mikulka and Alvin Isaacs

ABSTRACT: Novel products comprising an adhesive coated polyester film laminated to a cellulose ester through a "tie-coat" consisting essentially of plasticized nitrocellulose.

PATENTED JUN 1 1971 3,581,417

INVENTORS
Paul A. Andrews
and
BY Paul A. Plasse
Brown and Mikulka
and
Alvin Isaacs
ATTORNEYS

AN IDENTIFICATION CARD HAVING A TRANSPARENT LAYER BONDED TO AN INFORMATION BEARING SURFACE THROUGH A NITROCELLULOSE TIE-COAT

BACKGROUND OF THE INVENTION

Polymerized polyethylene glycol esters, e.g., "Mylar" (trademark of E. I. duPont, deNemours & Co. for a polyethylene glycol ester of terephthalic acid) provide particularly desirable transparent overlays for lamination to a cellulose ester. It is frequently desirable that the bonding of the respective materials in the laminate be quite strong and uniform throughout the interface of the respective layers. In instances where the resulting laminate is an identification (ID) card including a cellulose ester layer bearing the protective overlay, the tight bonding is particularly advantageous as a security seal to prevent tampering with the card.

An especially desirable and expedient procedure for preparing such a laminate would be through the use of an adhesive, e.g., a heat-activated or pressure-sensitive adhesive such as those heretofore known in the art. For example, it would be very desirable if the lamination could be obtained by providing a heat-activated adhesive to the laminating surface of one or both of the overlay and the cellulose ester, and thereafter bring the respective layers or sheets together in the presence of heat to obtain a good strong lamination which, at best, can only be separable with extreme difficulty.

However, prior to the present invention laminations of the above nature and description have not been obtainable. The present invention is therefore directed to a simple and efficient method for providing a strong laminate of the aforementioned materials and to products including such a laminate, e.g., ID cards comprising an image-bearing layer which may or may not be contained on a suitable support, a layer of cellulose ester laminated to the surface of the image-bearing layer, and a polyethylene glycol ester overlay laminated to the outer surface of the cellulose ester layer.

SUMMARY OF THE INVENTION

According to the present invention, laminates of the foregoing description are obtained by employing a plasticized nitrocellulose "tie-coat" between the cellulose ester and a heat-activated adhesive-coated polyethylene glycol ester overlay.

DESCRIPTION OF PREFERRED EMBODIMENT

Figure 1:
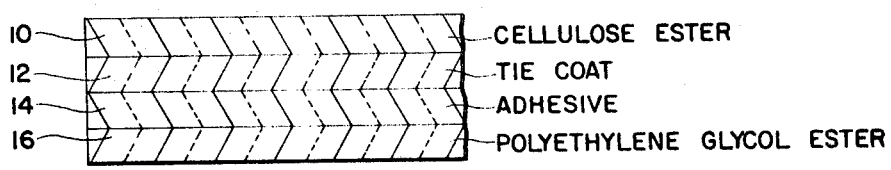
FIG. 1 is an enlarged, diagrammatic, fragmentary sectional view of a laminate prepared in accordance with this invention.

In the preferred embodiment, the overlay is a polyethylene glycol ester of terephthalic acid having a heat-activated polyester adhesive coated on one surface thereof, the cellulose ester is cellulose acetate butyrate, and the tie-coat comprises an organic solution of nitrocellulose plasticized with camphor.

As was mentioned previously, this invention relates to novel laminates including a layer or sheet of a cellulose ester securely bonded to an adhesive-coated polyethylene glycol ester through a plasticized nitrocellulose tie-coat and to products such as ID cards and the like including the same.

A primary object of this invention, therefore, is to provide novel products of this description.

Another object is to provide novel procedures for preparing such laminates.

Yet another object is to provide novel ID cards having a transparent polyethylene glycol ester overlay securely laminated to at least one side thereof.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings.

Polymerized polyethylene glycol esters, particularly "Mylar" have been found to be particularly desirable protective transparent overlays due to the strength, flexibility, and antiabrasive nature of the esters. In many instances, it would be most desirable to secure such an overlay to a cellulose ester layer or sheet material in such a fashion that the respective layers are tightly bonded or secured throughout the surface dimensions at the interface. For example, it would be most desirable to provide an ID card including a top layer of a cellulose ester over the image-bearing surface with a protective "Mylar" overlay which is tightly laminated thereto in such a fashion as to provide a laminate which, in addition to contributing to the strength, rigidity and stability of the card, provides further means of precluding tampering with the card. In the field of ID cards, the advantages of a security seal of this nature are self-evident.

However, prior to the present invention attempts to obtain a satisfactory lamination of this nature have been unsuccessful. Thus, prior attempts to laminate the overlay to the cellulose ester through known heat-sensitive and/or pressure-sensitive adhesives have not achieved the desired results.

It has now been found that the desired lamination can be effected through the combination of a heat-activated polyester adhesive and a plasticized nitrocellulose tie-coat.

The invention will best be understood by reference to the accompanying drawing and the description thereof.

As shown in FIG. 1, in its simplest form the present invention contemplates laminates including, in order, a layer or sheet of a cellulose ester 10, a tie-coat consisting essentially of plasticized nitrocellulose 12, adhesive layer 14, and layer or sheet 16 of a polymerized polyethylene glycol ester.

As examples of suitable cellulosic esters contemplated for use in layer 10, mention may be made of cellulose nitrate, cellulose acetate, cellulose butyrate, cellulose propionate, cellulose acetate butyrate, cellulose acetate propionate, cellulose triacetate, etc., particularly useful cellulose esters being cellulose acetate butyrate and cellulose triacetate.

Tie-coat 12 may be nitrocellulose plasticized with camphor, e.g., a butyl acetate/acetone solution of the same commercially available from E. I. duPont, deNemours & Co. and designated as duPont 05458 Cement.

Adhesive layer 14 may comprise any of the class of adhesives known in the art as low molecular weight polyester adhesives.

Suitable polyester adhesive-coated "Mylar" overlays include "Permalam 'S'" (trademark of Laminators, Inc.) and "Schjel-Bond GT-300" (trademark of G. T. Schjeldahl Co.)

The laminate of FIG. 1 may be prepared by applying an organic solution of the tie-coat to the laminating surface of layer 10 and/or adhesive layer 14 of an adhesive-coated polyethylene glycol ester 16 and thereafter bringing the respective sheets together in the presence of heat to provide the requisite tight bonding.

Figure 2:
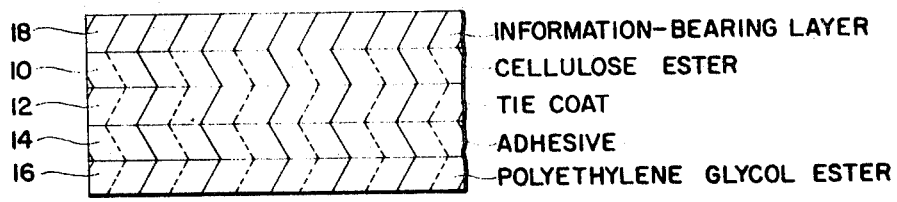
FIG. 2 is a similar view illustrating the applicability of this invention to ID cards.
Figure 3:
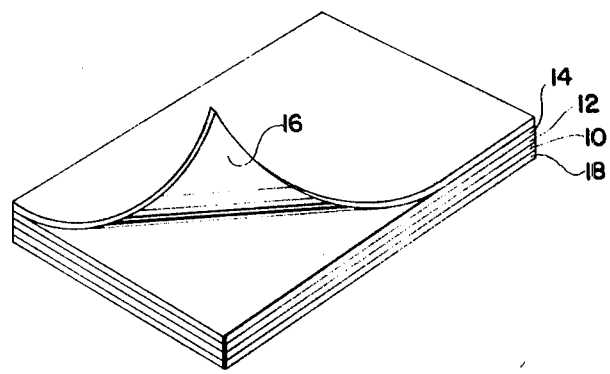
FIG. 3 is a perspective view of an ID card bearing a laminated protective overlay in accordance with this invention, with a corner of the respective layers separated for purposes of clarity.

The present invention is particularly adaptable to ID cards, as illustrated in FIGS. 2 and 3.

Such a card may take the form of an image-bearing layer 18 having a photographic likeness of the subject or bearer in one portion thereof and descriptive indicia at another portion thereof. It will be appreciated that the image-bearing layer may be contained on a suitable support (not shown) such as paper, glass, metal, etc., or the support may comprise a cellulose ester which may be the same as or different from the cellulose ester of layer 10. It will also be appreciated that the opposed or free surface of layer 18 (FIG. 2) may also have a layer of polyethylene glycol ester laminated thereto, e.g., in the aforementioned manner. This second layer of glycol ester may take the form of a second sheet material or, if desired, the two layers or sheets of glycol ester may be superposed initially and sealed around the periphery of three sides to form a pouch into which the card is inserted, the sealing of the open side and the laminations to the front and back surfaces of the card being accomplished at some time following insertion. Pouches of this nature are known in the art and hence per se comprise no part of this invention. It may also be sealed along only one or two sides, the remaining (open) sides being sealed after insertion of the card.

It will be appreciated that, at least in instances wherein the contemplated laminate includes an ID card or some other sheet desired to be viewed through the overlay, all of the respective layers covering the sheet to be viewed should be substantially transparent. In other instances, the layers need not be transparent, e.g., may contain a pigment or other colorant, if desired.

For purposes of this invention, the precise configuration of the image-bearing layer and the nature and manner of formation of the image contained thereon is immaterial. It may be a black-and-white image or it may be in color. The descriptive indicia may be a part of the photographic image, e.g., obtained by photographing both the subject and a data card containing the desired information, or the descriptive indicia may be supplied by a separate operation, for example, by typing on the surface.

Particularly useful procedures for preparing photographic images are the silver diffusion transfer procedures for preparing black-and-white images described and claimed, for example, in U.S. Pat. Nos. 2,543,181 and 2,647,056 issued to Edwin H. Land; and the diffusion transfer procedures for preparing color images described and claimed in U.S. Pat. No. 2,983,606 issued to Howard G. Rogers.

A preferred system for preparing an ID card such as is shown in FIGS. 2 and 3 utilizes one of the aforementioned diffusion transfer processes. In this preferred system, a data card containing the desired descriptive information is inserted into the camera so that both the subject and the descriptive matter pertaining to him are simultaneously photographed to provide single developable image which is thereafter processed to provide a transfer print comprising a suitable support having thereon an image-bearing layer containing an image of the subject a one portion thereof and the descriptive matter at another portion thereof. While the resulting print is still slightly moist from the processing composition, the cellulose ester layer may be laminated to the surface of the image-bearing layer with the aid of a water-activated adhesive and pressure to provide an ID card comprising the photographic transfer image having a layer of cellulose ester secured to the surface of the image-bearing layer. The aforementioned procedures for preparing the ID card may be accomplished most expeditiously with Polaroid ID-2 Land Identification System.

The following examples show by way of illustration and not by way of limitation the practice of this invention.

EXAMPLE I

To the free outer (uncoated) surface of a sheet of cellulose acetate butyrate containing a water-activated polyvinyl alcohol adhesive was applied a butyl acetate/acetone solution of nitrocellulose plasticized with camphor to provide on this surface a plasticized nitrocellulose coating the dry thickness of which was on the order of 0.3 to 0.5 mil.

Polacolor Type 108 Land film was inserted into the No. 926 Land Identification Card Camera of a Polaroid ID-2 Land Identification System. A data card was then inserted and this card and the subject were simultaneously photographed to provide a developable image on the photosensitive element of the film. The exposed photosensitive element was then pulled from the camera while in superposition with the image-receiving element of the film, the two elements were maintained in superposition outside the camera for approximately 60 seconds and then separated to reveal a positive multicolor transfer image. While the transfer image was still slightly moist the surface of the cellulose acetate butyrate sheet containing the water-activated adhesive was applied thereover with a Polaroid No. 930 ID Security Laminator, thus laminating the print to the cellulose acetate butyrate. "Permalam 'S'" polyester adhesive-coated Mylar was then laminated to the outer surface of the cellulose acetate butyrate sheet containing the nitrocellulose tie-coat, the lamination being effected at a temperature of approximately 300° F. The adhesion of the respective layers in the laminate was excellent initially and was observed to get still better with time.

EXAMPLE 2

The procedure of example 1 was repeated substituting cellulose triacetate for the cellulose acetate butyrate. A laminate exhibiting substantially the same strong adhesion was obtained.

Since certain changes may be made in the above product and process without departing from the scope of the invention herein involved, it is intended that all matter contained in the above description or shown in the accompanying drawing shall be interpreted as illustrative and not in a limiting sense.

What I claim is:

1. A laminar product comprising a layer or sheet of a polymeric condensation reaction product of an ethylene glycol and a polycarboxylic acid laminated to a layer or sheet of a cellulose ester through a polyester adhesive layer and a plasticized nitrocellulose tie-coat layer.

2. A product as defined in claim 1 wherein said cellulose ester is cellulose nitrate, cellulose acetate, cellulose butyrate, cellulose propionate, cellulose acetate butyrate, cellulose acetate propionate or cellulose triacetate.

3. A product as defined in claim 1 wherein said reaction product comprises a polyethylene glycol ester of terephthalic acid.

4. A product as defined in claim 1 including a layer having an information-bearing surface laminated to the opposed surface of said cellulose ester.

5. An identification card comprising a laminar structure including, in order, a layer containing a photographic image; a layer of cellulose ester bonded to the surface of said first layer; a layer of plasticized nitrocellulose; a layer of polyester adhesive, and an overlay of a polymeric condensation reaction product of an ethylene glycol and a polycarboxylic acid all of said layers over said photographic image being effectively transparent so as to permit viewing and inspection of said image.

6. An identification card as defined in claim 5 wherein said photographic image includes a multicolor reproduction of the subject in addition to descriptive indicia.

7. An identification card as defined in claim 5 wherein said cellulose ester is cellulose acetate butyrate or cellulose triacetate.

8. A card as defined in claim 5 wherein said image-containing layer is bonded to said cellulose ester layer through a water-activated adhesive.

9. A process for preparing an identification card laminar structure including the steps of bonding the surface of a photographic print to a layer or sheet comprising a cellulose ester; and thereafter laminating a layer or sheet of a polymeric condensation reaction product of an ethylene glycol and a polycarboxylic acid to the free surface of said cellulose ester material through a heat-activated polyester adhesive layer and a plasticized nitrocellulose tie-coat layer.

10. A process for preparing an identification card comprising the steps of processing an exposed photosensitive element containing a developable image to provide a positive photographic image; while said image is still moist from processing, bonding the surface thereof to a layer of cellulose ester through a water-activated adhesive coated on one surface of said ester layer; at some time prior or subsequent to said bonding, applying a tie-coat of plasticized nitrocellulose to the opposed surface of said ester layer; and thereafter heat sealing an overlay of a polymeric condensation reaction product of an ethylene glycol and a polycarboxylic acid to the opposed surface of said cellulose ester layer containing said tie-coat.

11. A process as defined in claim 10 wherein said photographic image is obtained by simultaneously exposing a photosensitive element to the subject of said identification card and a data card containing identifying indicia to obtain a developable image of the same; and processing said exposed photosensitive element while in superposition with an image-receiving element to form a positive multicolor transfer image.